(12) United States Patent
Badrossamay et al.

(10) Patent No.: US 10,927,956 B2
(45) Date of Patent: *Feb. 23, 2021

(54) SEALS

(71) Applicant: SAINT-GOBAIN PERFORMANCE PLASTICS CORPORATION, Solon, OH (US)

(72) Inventors: Mohammad R. Badrossamay, Laguna Hills, CA (US); Yuri Ebata, West Grove, PA (US); Bedros J. Taslakian, Northridge, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,426

(22) Filed: Jan. 3, 2020

(65) Prior Publication Data

US 2020/0141496 A1 May 7, 2020

Related U.S. Application Data

(62) Division of application No. 15/220,956, filed on Jul. 27, 2016, now Pat. No. 10,550,942.

(Continued)

(51) Int. Cl.
*F16J 15/10* (2006.01)
*F16J 15/3236* (2016.01)
(Continued)

(52) U.S. Cl.
CPC ......... *F16J 15/3236* (2013.01); *C09K 3/1009* (2013.01); *F16J 15/3212* (2013.01); *F16J 15/3284* (2013.01)

(58) Field of Classification Search
CPC ...... F16J 15/32; F16J 15/3204; F16J 15/3212; F16J 15/3232; F16J 15/3236; F16J 15/3284

See application file for complete search history.

(56) References Cited

U.S. PATENT DOCUMENTS

| | | | |
|---|---|---|---|
| 3,185,491 A | 5/1965 | Anderson | |
| 4,239,242 A | 12/1980 | Burns | |

(Continued)

FOREIGN PATENT DOCUMENTS

| | | |
|---|---|---|
| CN | 1071495 A | 4/1993 |
| CN | 1954149 A | 4/2007 |

(Continued)

OTHER PUBLICATIONS

International Search Report and Written Opinion for PCT/US2016/044227, dated Nov. 3, 2016, 15 pages.

(Continued)

*Primary Examiner* — Gilbert Y Lee
(74) *Attorney, Agent, or Firm* — Abel Schillinger, LLP; Chi Suk Kim

(57) ABSTRACT

A seal comprising a jacket comprising an annular body defining a central axis and a recess extending into the annular body concentric to the central axis, wherein the jacket comprises at least 30 wt % of a PTFE and at least 10 wt % of a filler material, and wherein the filler material comprises a boron-containing material, a nitrogen-containing material, a titanium-containing material, a silicon-containing material, a carbon fiber, a glass fiber, or a combination thereof; and an energizing element disposed in the recess.

19 Claims, 1 Drawing Sheet

Related U.S. Application Data

(60) Provisional application No. 62/198,061, filed on Jul. 28, 2015.

(51) Int. Cl.
*F16J 15/3212* (2016.01)
*F16J 15/3284* (2016.01)
*C09K 3/10* (2006.01)

(56) References Cited

U.S. PATENT DOCUMENTS

| | | | |
|---|---|---|---|
| 5,163,692 A | 11/1992 | Schofield et al. | |
| 5,236,202 A | 8/1993 | Krouth et al. | |
| 5,984,316 A | 11/1999 | Balsells | |
| 6,129,362 A | 10/2000 | Kashima et al. | |
| 6,352,264 B1 | 3/2002 | Dalzell, Jr. et al. | |
| 6,372,836 B1 | 4/2002 | Johnson | |
| 6,464,231 B2 | 10/2002 | Burroughs | |
| 6,601,337 B1 | 8/2003 | Takarazuka | |
| 6,830,641 B2 | 12/2004 | Kosty et al. | |
| 7,021,632 B2 | 4/2006 | Grace | |
| 7,341,258 B2 | 3/2008 | Holt et al. | |
| 7,513,506 B2 | 4/2009 | Kondo et al. | |
| 7,658,387 B2 | 2/2010 | Park | |
| 8,251,373 B2* | 8/2012 | Lev | F16J 15/3236 277/442 |
| 9,182,041 B2 | 11/2015 | Daub et al. | |
| 9,400,506 B2 | 7/2016 | Shima et al. | |
| 9,726,291 B2 | 8/2017 | Sonleiter et al. | |
| 9,920,837 B2 | 3/2018 | Tadano | |
| 2005/0067793 A1* | 3/2005 | Klenk | F16J 15/3228 277/549 |
| 2007/0013143 A1 | 1/2007 | Schroeder et al. | |
| 2007/0045967 A1 | 3/2007 | Park | |
| 2010/0066032 A1* | 3/2010 | Girman | F16J 15/322 277/522 |
| 2010/0166582 A1* | 7/2010 | Racicot | F04B 39/041 417/437 |
| 2011/0006484 A1* | 1/2011 | Dietle | F16J 15/008 277/549 |
| 2011/0079962 A1* | 4/2011 | Munro | F16J 15/3212 277/500 |
| 2011/0135454 A1 | 6/2011 | Grondahl | |
| 2015/0034858 A1 | 2/2015 | Raman et al. | |
| 2015/0035235 A1 | 2/2015 | Tsuda | |
| 2015/0184749 A1 | 7/2015 | Fukasawa et al. | |
| 2016/0334017 A1 | 11/2016 | Tadano | |
| 2017/0030468 A1 | 2/2017 | Badrossamay et al. | |

FOREIGN PATENT DOCUMENTS

| | | |
|---|---|---|
| EP | 2886913 A1 | 6/2015 |
| JP | H11241767 A | 9/1999 |
| JP | 2013032848 A | 2/2013 |
| JP | 2015135137 A | 7/2015 |
| WO | 2004094528 A1 | 11/2004 |
| WO | 2017019753 A1 | 2/2017 |

OTHER PUBLICATIONS

Supplementary European Search Report for EP16831281, dated Mar. 11, 2019, 9 pages.

* cited by examiner

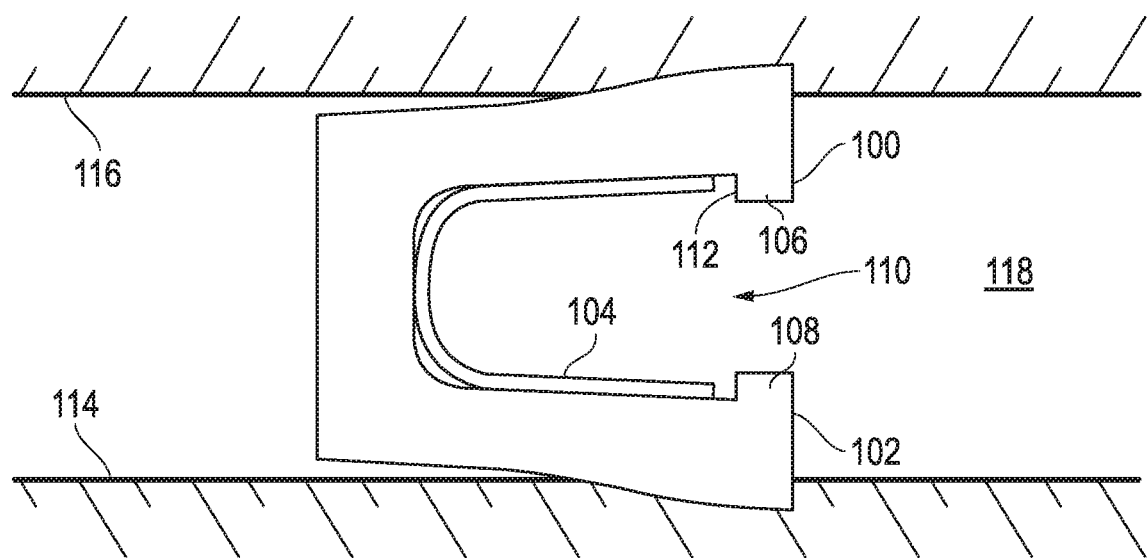

SEALS

CROSS-REFERENCE TO RELATED APPLICATION(S)

This application is a divisional and claims priority under 35 U.S.C. § 120 to U.S. patent application Ser. No. 15/220,956 entitled, "SEALS," by Mohammad R. BADROSSA-MAY et al., filed Jul. 27, 2016, which application claims priority under 35 U.S.C. § 119(e) to U.S. Provisional Application No. 62/198,061 entitled, "SEALS," by Mohammad R. BADROSSAMAY, filed Jul. 28, 2015, of which all are assigned to the current assignee hereof and incorporated herein by reference in their entireties.

FIELD OF THE DISCLOSURE

The present disclosure relates to seals.

RELATED ART

Seals are typically used to prevent leakage from occurring within an annulus between two components, e.g., inner and outer components like a shaft and a bore. A seal may be positioned between the shaft and the bore to maintain different fluidic pressures or to separate different fluidic components on opposing sides of the seal. Traditional seals often fail upon exposure to high temperatures (e.g., 350° C.) for prolonged periods of time. Industries, such as those associated with high performance engines, continue to demand seals capable of withstanding high temperatures for prolonged periods of time while maintaining an effective sealing characteristic.

BRIEF DESCRIPTION OF THE DRAWINGS

Embodiments are illustrated by way of example and are not intended to be limited in the accompanying FIGURE.

FIG. 1 includes a cross-sectional view of a seal in accordance with an embodiment.

DETAILED DESCRIPTION

The following description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

Seals in accordance with embodiments described herein, can generally include a jacket defining a recess and an energizing element disposed in the recess. In certain embodiments, the jacket may comprise a homogenous composition including, for example, at least 30 wt % of a polymeric material and at least 10 wt % of a filler material. The filler material may be embedded within the polymeric material, enhancing one or more attributes of the jacket. In particular embodiments, the filler material may include a boron-containing material, a nitrogen-containing material, a titanium-containing material, a silicon-containing material, a carbon fiber, a glass fiber, or a combination thereof.

Referring to FIG. 1, a seal 100 can generally include a jacket 102 and an energizing element 104. The jacket 102 may include fingers 106 and 108 defining a recess 110. In an embodiment, the fingers 106 and 108 may be symmetrical about a line 112 such that the recess 110 is also symmetrical. The energizing element 104 may be disposed within the recess 110, such as partially disposed in the recess 110 or entirely disposed in the recess 110. In an embodiment, at least one of the fingers 106 and 108 may include a distal flange 112 extending toward the recess 110. The distal flange 112 may prevent dislodgment of the energizing element 104 from the recess 110.

The energizing element 104 may include a body adapted to provide an outwardly biasing force in at least one outwardly oriented direction, such as toward at least one of the fingers 106 and 108. In an embodiment, the energizing element 104 may consist of a spring, such as, for example, a helical spring or a body having an O-shaped cross-sectional profile. In another embodiment, the energizing element 104 may have a cross-sectional profile selected from a D-shape, a U-shape, or a C-shape. In a particular embodiment, the energizing element 104 may have a cantilevered profile where surfaces of the energizing element 104 extend in a manner adjacent to at least one of the fingers 106 or 108. The cantilevered portions of the energizing element 104 may outwardly bias the fingers 106 and 108 apart from one another.

In a particular instance, the energizing element 104 can have a wrapped design. For example, an internal portion of the energizing element 104 may include a first material different from a material of an external portion of the energizing element 104. The external portion may wrap around all, or a portion, of the internal portion. In another instance, the energizing element 104 may include a wire having an arcuate cross section. The wire may be coiled or wrapped so as to form a generally O-shaped cross section. In yet another instance, the energizing element 104 may include a ribbon wrapped so as to form a generally O-shaped cross section. In a particular embodiment, the ribbon may have two major surfaces spaced apart from each other by a thickness. The ribbon may define a length, a width, and a thickness, where the length is greater than the width, and where the width is greater than the thickness. The ribbon may be wound such that adjacent coils partially overlap one another in a radial direction, such as by at least 10%, at least 20%, or at least 30%, or such that adjacent coils do not overlap in a radial direction. Prior to installation, the energizing element 104 may define a diameter that is greater than a diameter of the recess 110. That is, in an embodiment, the energizing element 104 may be oversized for the recess 110.

In an embodiment, the energizing element 104 may float relative to the jacket 102. More particularly, the energizing element 104 may move freely with respect to the recess 110. In another embodiment, the energizing element 104 may be coupled to the jacket 102, such as, for example, by an adhesive, mechanical deformation of one or both of the jacket 102 and energizing element 104, a threaded or non-threaded fastener, or by at least partially embedding the energizing element 104 within the jacket 102. In an embodiment, ends of the energizing element 104 may be encapsulated within the jacket 102 so as to prevent dislodgement of the energizing element 104 from the jacket 102. In embodiments utilizing adhesive, the adhesive layer (not illustrated) may be disposed between at least a portion of the energizing element 104 and the jacket 102. The adhesive layer may comprise a hot melt adhesive. Examples of adhesives that can be used include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

By way of a non-limiting example, the energizing element 104 may include a polymer, a metal, an alloy, or a combination thereof. In a particular embodiment, the energizing element 104 includes a metal. Exemplary metals include steel, bronze, copper, Monel, Inconel, Elgiloy, Hastelloy, and oil tempered chrome silicon or vanadium. In an embodiment, the energizing element 104 may include molybdenum, cobalt, iron, chromium, copper, manganese, titanium, zirconium, aluminum, carbon, tungsten, or any combination thereof. In a particular embodiment, the energizing element 104 includes stainless steel, such as 301 Stainless Steel, 302/304 Stainless Steel, 316 Stainless Steel, or 17-7 Stainless Steel.

In an embodiment, one or more corrosion resistant coatings (not illustrated) can be applied to the energizing element 104. The corrosion resistant coating can have a thickness in a range of 1 to 50 microns, such as in a range of 5 to 20 microns, or even in a range of 7 to 15 microns. The corrosion resistant coating can include an adhesion promoter layer and an epoxy layer. In an embodiment, an epoxy layer can increase the corrosion resistance of the energizing element 104. For example, the epoxy layer can substantially prevent corrosive elements, such as water, salts, and the like, from contacting the energizing element 104, thereby inhibiting chemical corrosion thereof.

In certain embodiments, the jacket 102 may have an average surface roughness, Ra, of at least 0.01, at least 0.1, or at least 0.2. In other embodiments, Ra may be no greater than 1, no greater than 0.5, or no greater than 0.4. In a particular embodiment, the jacket 102 can have an Ra in a range between and including 0.1 and 0.7. More particularly, Ra can be in a range between and including 0.2 and 0.4.

The jacket 102 may have a Shore D hardness of at least 45, at least 50, at least 55, at least 60, at least 65, at least 70, or at least 75. In an embodiment, the jacket 102 may have a Shore D hardness no greater than 100, no greater than 90, or no greater than 80. It may be desirable for the jacket 102 to include a material having a Shore D hardness in a range between and including 45 to 100 to prevent destruction of the jacket 102 during prolonged uses while affording the seal 100 a sufficiently low sealing characteristic.

In certain embodiments, the jacket 102 may include a polymeric material. Exemplary polymers include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. In accordance with a particular embodiment, the jacket 102 may include a fluoropolymer. Exemplary fluoropolymers include fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. PTFE is used in accordance with particular embodiments described herein as it exhibits superior sealing characteristics while maintaining a low friction interface between moving components.

In certain embodiments, the jacket 102 can include a mixture with at least 30 wt % PTFE, at least 35 wt % PTFE, at least 40 wt % PTFE, at least 45 wt % PTFE, or at least 50 wt % PTFE. In other embodiments, mixture can be no greater than 90 wt % PTFE, no greater than 75 wt % PTFE, no greater than 70 wt % PTFE, no greater than 65 wt % PTFE, no greater than 60 wt % PTFE, or no greater than 55 wt % PTFE. In a particular embodiment, the jacket 102 can include a mixture including PTFE within a range between and including 30 wt % and 90 wt % of the jacket. In certain embodiments, the mixture can include PTFE within a range between and including 40 wt % and 60 wt % of the jacket. In other embodiments, the mixture can include PTFE within a range between and including 60 wt % and 90 wt % of the jacket.

In an embodiment, the mixture may further include a filler material. The filler material can include a boron-containing material, a nitrogen-containing material, a titanium-containing material, a silicon-containing material, a carbon fiber, a glass fiber, or a combination thereof. In a more particular embodiment, the filler material may include titanium boride, boron nitride, silicone powder, or any combination thereof.

In an embodiment, the mixture may include at least 10 wt % of the filler material, at least 15 wt % of the filler material, at least 20 wt % of the filler material, at least 25 wt % of the filler material, at least 30 wt % of the filler material, at least 35 wt % of the filler material, or at least 40 wt % of the filler material. In an embodiment, the mixture may include no greater than 70 wt % of the filler material, no greater than 65 wt % of the filler material, no greater than 60 wt % of the filler material, no greater than 55 wt % of the filler material, no greater than 50 wt % of the filler material, or no greater than 45 wt % of the filler material. In a particular embodiment, the filler material may be homogenously distributed throughout the mixture. Homogenous distribution may facilitate even wear rates within the jacket 102, preventing the formation of localized wear, such as localized cracking or localized wear. In another particular embodiment, the filler material may be non-homogenously distributed throughout the mixture. In such a manner, the wt % of filler material may be different at a first location within the jacket 102 as compared to a second location therein. For example, the filler material may be more heavily deposited in at least one, such as both, of the fingers 106 and 108 as compared to a heel of the jacket 102 connecting the fingers 106 and 108 together. Alternatively, the heel may include a higher concentration of the filler material as compared to one or both of the fingers 106 and 108.

In a particular instance, the mixture may include PTFE within a range of between and including 45-55 wt % of the mixture, carbon fiber within a range of between and including 30-50 wt % of the mixture, and titanium boride within a range of between and including 5-15 wt % of the mixture. In a more particular instance, the mixture can include approximately 50 wt % of a PTFE, approximately 40 wt % of a carbon fiber, and approximately 10 wt % of a titanium boride.

In another particular instance, the mixture may include PTFE within a range of between and including 45-55 wt % of the mixture, glass fiber within a range of between and including 30-50 wt % of the mixture, and titanium boride within a range of between and including 5-15 wt % of the mixture. In a more particular instance, the jacket 102 can include approximately 50 wt % of a PTFE, approximately 40 wt % of a glass fiber, and approximately 10 wt % of a titanium boride.

In yet another particular instance, the mixture can include approximately 75 wt % of PTFE and approximately 25 wt % of a boron nitride.

In yet a further particular instance, the mixture can include approximately 85 wt % of PTFE and approximately 15 wt % of a silicone powder.

In a particular embodiment, the mixture may be formed by combining any one or more of the filler materials described above with a polymeric material, such as PTFE. Mixing may be performed until the mixture is homogenously distributed such that the density of filler material is relatively even. The mixture may then be shaped into an annular body. In a particular embodiment, shaping may be performed by extrusion, molding, casting, rolling, stamping, cutting, or any combination thereof. In certain embodiments, the shaped annular body may be cured for a period of time, such as at least 1 hour. At such time, the shaped annular body may include the recess 110. Alternatively, the shaped annular body may be machined to form the recess 110. More specifically, material can be removed from the shaped annular body until the recess 110 is suitably formed.

In an embodiment, the energizing element 104 may be positioned in the recess 110 after formation of the shaped annular member. In another embodiment, the energizing element 104 may be positioned relative to the shaped annular member while the mixture is still soft, supple, pliable, or otherwise not fully cured. This may be suitable for application where the energizing element 104 is partially, or fully, encapsulated within the jacket 102.

In accordance with certain embodiments, the seal 100 may be used between inner and outer components 114 and 116, such as a shaft and a bore, respectively. More particularly, the seal 100 may be disposed within an annulus formed by an area within a bore of the outer component 116 and an outer surface of the inner component 114. In certain embodiments, the inner component 114 may longitudinally translate, e.g., reciprocate, relative to the outer component 116. In other embodiments, the inner component 114 may rotate relative to the outer component 116. The seal 100 may prevent or reduce ingress or egress of one or more fluidic components from a first side of the seal to a second, opposite side thereof.

In a particular instance the inner and outer components 114 and 116 may be part of a high temperature assembly. That is, the assembly may operate at elevated temperatures, such as at least 275° C., at least 300° C., at least 325° C., or even at least 350° C. By way of a non-limiting embodiment, the assembly may include an engine, such as a jet engine, where a shaft rotates relative to one or more compressors or turbines. The seal 100 may be disposed between the shaft and at least one of the compressors or turbines, preventing or mitigating undesirable fluidic leakage, such as air leakage, fuel leakage, or pressure leakage as caused by a pressure differential on opposing sides of the seal.

The seal 100 may be adapted for prolonged use at elevated temperatures. In an embodiment, the seal may have an effective lifespan, as measured at 350° C., of at least 60,000 minutes, at least 65,000 minutes, at least 70,000 minutes, at least 75,000 minutes, at least 80,000 minutes, at least 85,000 minutes, at least 90,000 minutes, at least 95,000 minutes, at least 100,000 minutes, or at least 120,000 minutes. As used herein, "effective lifespan" describes a period of time in which the seal or an assembly including the seal exhibits a minimum desired sealing operational characteristic (i.e., how long the seal or assembly can operate at or below a prescribed leakage rate). The effective lifespan is measured according to a Static Test. The Static Test is a measure of the seals leakage rate when installed within an annulus. The seal may have an initial inner diameter of 101 mm and an initial outer diameter of 108 mm. The annulus may have a groove which fits the seal such that the seal may be installed within the groove. A pressure of 15 PSI is applied to one side of the seal while the other side of the seal is at room temperature (i.e., 22° C.) and ambient pressure. The assembly is maintained at this condition under a prescribed temperature for a duration of time, during which time a sensor monitors for fluid leakage. In a further embodiment, the seal may have an effective lifespan, as measured at 365° C., of at least 60,000 minutes, at least 65,000 minutes, at least 70,000 minutes, at least 75,000 minutes, at least 80,000 minutes, at least 85,000 minutes, at least 90,000 minutes, at least 95,000 minutes, at least 100,000 minutes, or at least 120,000 minutes. After such time, the seal 100 may have a sealing operational characteristic within a prescribed leakage rate.

In a particular embodiment, the seal can have a leakage rate of less than 100 cubic centimeters per minute (cc/min), as measured at 350° C. using the Static Test. In a more particular embodiment, the seal can have a leakage rate of less than 90 cc/min, less than 80 cc/min, less than 70 cc/min, less than 60 cc/min, less than 50 cc/min, less than 40 cc/min, less than 30 cc/min, or less than 20 cc/min. In another embodiment, the seal can have a leakage rate of less than 100 cc/min, as measured at 365° C. using the Static Test. In a more particular embodiment, the seal can have a leakage rate of less than 90 cc/min, less than 80 cc/min, less than 70 cc/min, less than 60 cc/min, less than 50 cc/min, less than 40 cc/min, less than 30 cc/min, or less than 20 cc/min.

After prolonged use, the jacket 102 may develop indentations or markings along the recess 110 where the energizing element 104 contacted and biased against. The indentation depth, as measured by a greatest depth of the indentation in a direction normal to the surface of the jacket 102, is largely based on material characteristics of the jacket 102 and energizing element 104. In an embodiment, the indentation depth, as measured after 60,000 minutes of operation at 350° C. is less than 0.5 mm, less than 0.45 mm, less than 0.4 mm, less than 0.35 mm, less than 0.3 mm, less than 0.25 mm, less than 0.2 mm, less than 0.15 mm, less than 0.1 mm, less than 0.05 mm, or less than 0.01 mm. As the indentation depth decreases with usage of different materials, it is believed the effective lifespan of the seal 100 may increase. Thus, in particular embodiments, the indentation depth is less than 0.25 mm.

The weight of the seal may change after prolonged exposure to elevated temperatures. This may be caused, for example, by material degradation resulting from thermal instability of the jacket under loading and thermal conditions. In this regard, the seal 100 may have an initial specific gravity, $G_I$, as measured prior to heat exposure, and an aged specific gravity, $G_A$, as measured after exposure to 365° C. for 60,000 minutes. In an embodiment, $G_I$ can be greater than $G_A$. For example, a ratio of $G_I/G_A$ can be less than 1.4, less than 1.35, less than 1.3, less than 1.25, less than 1.2, less than 1.15, less than 1.1, or less than 1.05. In another embodiment, $G_I$ can be approximately equal to $G_A$. That is, the weight of the seal 100 can remain relatively unchanged after exposure to 365° C. for 60,000 minutes, such that $G_I/G_A$ may be approximately 1. In a particular embodiment, a ratio of $G_I/G_A$ can be in a range between and including 0.95 and 1.25, in a range between and including 0.96 and 1.2, or in a range between and including 0.99 and 1.16.

In an embodiment, the jacket material can have an initial elongation at break, $EAB_I$, as measured prior to exposure to elevated temperature, and an effective elongation at break, $EAB_E$, as measured after exposure to elevated temperature, wherein $EAB_I$ is no greater than 150% $EAB_E$, no greater than 145% $EAB_E$, no greater than 140% $EAB_E$, no greater than 135% $EAB_E$, no greater than 130% $EAB_E$, no greater than 125% $EAB_E$, no greater than 120% $EAB_E$, no greater than 115% $EAB_E$, no greater than 110% $EAB_E$, or no greater than 105% $EAB_E$. In an embodiment, a ratio of $EAB_I/EAB_E$ may be approximately 1.0. That is, the elongation at break of the jacket 102 may be relatively the same as measured before and after exposure to elevated temperatures. This may reduce wear and fatigue generally associated with extended periods of usage at elevated temperatures. In yet a further embodiment, $EAB_I/EAB_E$ may be less than 1.0, such as less than 0.995, less than 0.99, or less than 0.985.

In another embodiment, the jacket material can have an elongation at ultimate tensile strength (UTS) which is relatively unchanged after exposure to elevated temperatures. For example, the jacket 102 may have a $UTS_I$, as measured prior to exposure to elevated temperature, and a $UTS_E$, as measured after exposure to elevated temperature, where a ratio of $UTS_E:UTS_I$ is no less than 1:5, no less than 1:4, no less than 1:3, no less than 1:2, no less than 1:1, no less than 2:1, no less than 3:1, no less than 4:1, or even no less than 5:1. In an embodiment, $UTS_E/UTS_I$ can be less than 5, less than 4, less than 3, less than 2, less than 1, less than 0.9, less than 0.8, less than 0.7, or less than 0.6. In another embodiment, $UTS_E$ can be at least 101% $UTS_I$, at least 105% $UTS_I$, at least 110% $UTS_I$, at least 115% $UTS_I$, at least 120% $UTS_I$, or at least 125% $UTS_I$.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A seal comprising:
a jacket comprising an annular body defining a central axis and a recess extending into the annular body concentric to the central axis, wherein the jacket comprises at least 30 wt % of a PTFE and at least 10 wt % of a filler material, and wherein the filler material comprises a boron-containing material, a nitrogen-containing material, a titanium-containing material, a silicon-containing material, a carbon fiber, a glass fiber, or a combination thereof; and
an energizing element disposed in the recess.

Embodiment 2. A seal comprising:
a jacket comprising an annular body defining a central axis and a recess extending into the annular body concentric to the central axis; and
an energizing element disposed in the recess,
wherein the seal has an effective lifespan, as measured at 300° C. or 350° C. or 365° C., of at least 60,000 minutes.

Embodiment 3. A seal comprising:
a jacket comprising an annular body having a central axis and an outer surface defining a recess extending into the annular body concentric to the central axis; and
an energizing element disposed in the recess,
wherein the seal has a leakage rate of less than 100 cc/min, as measured at 350° C. using the Static Test, and wherein the jacket has an indentation depth, as measured at a location of the surface contacting the energizing element, of less than 0.25 mm.

Embodiment 4. An assembly comprising:
an inner component;
an outer component having a bore in which the inner component is disposed; and
a seal disposed between the inner and outer components, the seal comprising:
a jacket comprising an annular body having a central axis and an outer surface defining a recess extending into the annular body concentric to the central axis, wherein the jacket comprises at least 30 wt % of a PTFE and at least 10 wt % of a filler material, and wherein the filler material comprises a boron-containing material, a nitrogen-containing material, a titanium-containing material, a silicon-containing material, a carbon fiber, a glass fiber, or a combination thereof; and
an energizing element disposed in the recess.

Embodiment 5. The seal or assembly of any one of the preceding embodiments, wherein the energizing element comprises a body adapted to provide an outward force in at least one outwardly oriented direction, wherein the energizing element comprises a spring, wherein the energizing element comprises a helical spring.

Embodiment 6. The seal or seal assembly of any one of the preceding embodiments, wherein the energizing element has a cross-sectional profile selected from a D-shape, a U-shape, or a C-shape, wherein the energizing element has a cantilevered profile, wherein the energizing element has a wrapped design, wherein the energizing element comprises a wire having an arcuate cross section, wherein the energizing element comprises a ribbon, wherein the energizing element floats within the recess, wherein the energizing element is coupled to the jacket, wherein the energizing element is partially embedded within the jacket.

Embodiment 7. The seal or seal assembly of any one of the preceding embodiments, wherein the energizing element has an O-shaped cross-sectional profile.

Embodiment 8. The seal or seal assembly of any one of the preceding embodiments, wherein the energizing element comprises a polymer, a metal, an alloy, or a combination thereof, wherein the energizing element comprises a steel, wherein the energizing element comprises 301 Stainless Steel.

Embodiment 9. The seal or seal assembly of any one of the preceding embodiments, wherein the jacket comprises an inner finger and an outer finger, as viewed in cross section, wherein the inner and outer fingers are symmetrical about a line, wherein at least one of the inner and outer fingers comprises a distal flange extending toward the recess, wherein the energizing element is disposed entirely in the recess.

Embodiment 10. The seal or seal assembly of any one of the preceding embodiments, wherein the jacket comprises an average surface roughness, Ra, of at least 0.01, at least 0.1, or at least 0.2, wherein Ra is no greater than 1, no greater than 0.5, or no greater than 0.4, wherein Ra is in a range between and including 0.1 to 0.7, or in a range between and including 0.2 and 0.4.

Embodiment 11. The seal or seal assembly of any one of the preceding embodiments, wherein the jacket has a hardness, as measured according to hardness shore D of at least 45, at least 50, at least 55, at least 60, at least 65, at least 70, or at least 75, wherein the hardness as measured according to ShoreD, is no greater than 100, no greater than 90, or no greater than 80.

Embodiment 12. The seal or seal assembly of any one of the preceding embodiments, wherein the jacket comprises at least 30 wt % of a PTFE, at least 35 wt % of a PTFE, at least 40 wt % of a PTFE, at least 45 wt % of PTFE, or at least 50 wt % of a PTFE, wherein the jacket comprises no greater than 90 wt % of a PTFE, no greater than 75 wt % of a PTFE, no greater than 70 wt % of a PTFE, no greater than 65 wt % of a PTFE, no greater than 60 wt % of a PTFE, or no greater than 55 wt % of a PTFE.

Embodiment 13. The seal or seal assembly of any one of the preceding embodiments, wherein the jacket comprises at least 10 wt % of a filler material, at least 15 wt % of the filler material, at least 20 wt % of the filler material, at least 25 wt % of the filler material, at least 30 wt % of the filler material, at least 35 wt % of the filler material, or at least 40 wt % of the filler material, wherein the jacket comprises no greater than 70 wt % of the filler material, no greater than 65 wt % of the filler material, no greater than 60 wt % of the filler material, no greater than 55 wt % of the filler material, no greater than 50 wt % of the filler material, or no greater than 45 wt % of the filler material, wherein the filler material is homogenously distributed throughout the jacket, wherein the filler material is not homogenously distributed throughout the jacket.

Embodiment 14. The seal or seal assembly of any one of the preceding embodiments, wherein the jacket comprises a filler material, wherein the filler material comprises a boron-containing material, a nitrogen-containing material, a titanium-containing material, a silicon-containing material, a carbon fiber, a glass fiber, or a combination thereof.

Embodiment 15. The seal or seal assembly of any one of the preceding embodiments, wherein the jacket comprises a PTFE within a range of 45-55 wt % of the jacket, wherein the jacket comprises a carbon fiber filler within a range of 30-50 wt % of the jacket, wherein the jacket comprises a titanium boride filler within a range of 5-15 wt % of the jacket.

Embodiment 16. The seal or seal assembly of any one of the preceding embodiments, wherein the jacket comprises approximately 50 wt % of a PTFE, approximately 40 wt % of a carbon fiber, and approximately 10 wt % of a titanium boride.

Embodiment 17. The seal or seal assembly of any one of the preceding embodiments, wherein the jacket comprises a PTFE within a range of 45-55 wt % of the jacket, wherein the jacket comprises a glass fiber filler within a range of 30-50 wt % of the jacket, wherein the jacket comprises a titanium boride filler within a range of 5-15 wt % of the jacket.

Embodiment 18. The seal or seal assembly of any one of the preceding embodiments, wherein the jacket comprises approximately 50 wt % of a PTFE, approximately 40 wt % of a glass fiber, and approximately 10 wt % of a titanium boride.

Embodiment 19. The seal or seal assembly of any one of the preceding embodiments, wherein the jacket comprises approximately 75 wt % of a PTFE, and approximately 25 wt % of a boron nitride.

Embodiment 20. The seal or seal assembly of any one of the preceding embodiments, wherein the jacket comprises approximately 85 wt % of a PTFE, and approximately 15 wt % of a silicon powder.

Embodiment 21. The seal or seal assembly of any one of the preceding embodiments, wherein the seal has an effective lifespan, as measured at 300° C. or 350° C. or 365° C., of at least 60,000 minutes, at least 65,000 minutes, at least 70,000 minutes, at least 75,000 minutes, at least 80,000 minutes, at least 85,000 minutes, at least 90,000 minutes, at least 95,000 minutes, at least 100,000 minutes, or at least 120,000 minutes.

Embodiment 22. The seal or seal assembly of any one of the preceding embodiments, wherein the seal has a leakage rate of less than 100 cc/min, as measured at 350° C. using the Static Test, wherein the leakage rate is less than 90 cc/min, less than 80 cc/min, less than 70 cc/min, less than 60 cc/min, less than 50 cc/min, less than 40 cc/min, less than 30 cc/min, or less than 20 cc/min.

Embodiment 23. The seal or seal assembly of any one of the preceding embodiments, wherein the jacket has an indentation depth, as measured at a location of the surface contacting the energizing element after 60,000 minutes of operation, of less than 0.5 mm, less than 0.45 mm, less than 0.4 mm, less than 0.35 mm, less than 0.3 mm, less than 0.25 mm, less than 0.2 mm, less than 0.15 mm, less than 0.1 mm, less than 0.05 mm, or less than 0.01 mm.

Embodiment 24. The seal or seal assembly of any one of the preceding embodiments, wherein the jacket comprises a material having an initial specific gravity, $G_I$, as measured prior to heat exposure, and an aged specific gravity, $G_A$, as measured after exposure to 365 C for 60,000 minutes, and wherein $G_I/G_A$ is less than 1.4, less than 1.35, less than 1.3, less than 1.25, less than 1.2, less than 1.15, less than 1.1, less than 1.05, or less than 1.0, wherein $G_I/G_A$ is at least 0.5, at least 0.75, or at least 0.95

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. An assembly comprising:
an inner component;
an outer component having a bore; and
a seal disposed between the inner and outer components, the seal comprising:
a jacket comprising an annular body having a central axis and an outer surface defining a recess extending into the annular body concentric to the central axis, wherein the jacket comprises at least 30 wt % of a PTFE and at least 10 wt % of a filler material, and wherein the filler material comprises a boron-containing material, a nitrogen-containing material, a titanium-containing material, a silicon containing material, a carbon fiber, a glass fiber, or a combination thereof; and an energizing element disposed in the recess, wherein the jacket has an initial elongation at break, $EAB_I$, as measured prior to exposure to elevated temperature, and an effective elongation at break, $EAB_E$, as measured after exposure to elevated temperature, wherein $EAB_I$ is no greater than 150% $EAB_E$.

2. The assembly of claim 1, wherein the seal has an effective lifespan, as measured at 300° C. or 350° C. or 365° C., of at least 60,000 minutes.

3. The assembly of claim 1, wherein the seal has a leakage rate of less than 100 cc/min, as measured at 350° C. using the Static Test, and wherein the jacket has an indentation depth, as measured at a location of the surface contacting the energizing element, of less than 0.3 mm.

4. The assembly of claim 1, wherein the energizing element comprises a body adapted to provide an outward force in at least one outwardly oriented direction.

5. The assembly of claim 1, wherein the energizing element has a cross-sectional profile selected from a D-shape, a U-shape, or a C-shape.

6. The assembly of claim 1, wherein the energizing element has an O-shaped cross-sectional profile.

7. The assembly of claim 1, wherein the energizing element comprises a polymer, a metal, an alloy, or a combination thereof.

8. The assembly of claim 1, wherein the jacket comprises an inner finger and an outer finger, as viewed in cross section, wherein the inner and outer fingers are symmetrical about a line, wherein at least one of the inner and outer fingers comprises a distal flange extending toward the recess, wherein the energizing element is disposed entirely in the recess.

9. The assembly of claim 1, wherein the jacket comprises an average surface roughness, Ra, of at least 0.01 and no greater than 1 microns.

10. The assembly of claim 1, wherein the jacket has a hardness, as measured according to hardness shore D of at least 45 and no greater than 100.

11. The assembly of claim 1, wherein the jacket comprises at least 30 wt % of a PTFE and no greater than 90 wt % of a PTFE.

12. The assembly of claim 1, wherein the jacket comprises at least 10 wt % of a filler material, and no greater than 70 wt % of the filler material.

13. The assembly of claim 1, wherein the jacket comprises a filler material, wherein the filler material comprises a boron-containing material, a nitrogen-containing material, a titanium-containing material, a silicon-containing material, a carbon fiber, a glass fiber, or a combination thereof.

14. The assembly of claim 1, wherein the jacket comprises a PTFE within a range of 45-55 wt % of the jacket, wherein the jacket comprises a carbon fiber filler within a range of 30-50 wt % of the jacket, wherein the jacket comprises a titanium boride filler within a range of 5-15 wt % of the jacket.

15. The assembly of claim 1, wherein the jacket comprises a PTFE within a range of 45-55 wt % of the jacket, wherein the jacket comprises a glass fiber filler within a range of 30-50 wt % of the jacket, wherein the jacket comprises a titanium boride filler within a range of 5-15 wt % of the jacket.

16. The assembly of claim 1, wherein the jacket comprises approximately 75 wt % of a PTFE, and approximately 25 wt % of a boron nitride.

17. The assembly of claim 1, wherein the jacket comprises approximately a range of 70-85 wt % of a PTFE, and approximately 15-30 wt % of a silicon powder.

18. The assembly of claim 1, wherein the seal has a leakage rate of less than 100 cc/min, as measured at 350° C. using the Static Test.

19. The assembly of claim 1, wherein the jacket has an indentation depth, as measured at a location of the surface contacting the energizing element after 60,000 minutes of operation, of less than 0.5 mm.

* * * * *